United States Patent [19]
Harger

[11] Patent Number: 5,448,928
[45] Date of Patent: Sep. 12, 1995

[54] VARIABLE RATIO PARKING BRAKE LEVER WITH SELF-ADJUST CABLE TENSIONING MEANS

[75] Inventor: James R. Harger, Columbia, Mo.

[73] Assignee: Dura Automotive Systems, Inc., Troy, Mich.

[21] Appl. No.: 155,165

[22] Filed: Nov. 19, 1993

[51] Int. Cl.$^6$ .......................... G05G 1/04; B60T 7/02
[52] U.S. Cl. .................... 74/523; 74/501.6; 74/512; 74/516
[58] Field of Search ............ 74/523, 575, 577 R, 74/516, 512, 501.6

[56] References Cited

U.S. PATENT DOCUMENTS

| | | | |
|---|---|---|---|
| 2,278,645 | 4/1942 | Chase | 74/523 |
| 3,216,276 | 11/1965 | Nagy | |
| 3,487,716 | 1/1970 | Hirst, Jr. | |
| 3,897,694 | 8/1975 | Hirst, Jr. | |
| 3,938,407 | 2/1976 | Nisbet | 74/516 |
| 5,131,288 | 7/1992 | Barlas | 74/512 |
| 5,211,072 | 5/1993 | Barlas et al. | |
| 5,272,935 | 12/1993 | Heinemann et al. | 74/523 |
| 5,280,734 | 1/1994 | Riffle et al. | |

FOREIGN PATENT DOCUMENTS 2196416  4/1988  United Kingdom ............ 74/523

Primary Examiner—Charles A. Marmor
Assistant Examiner—Mary Ann Battista
Attorney, Agent, or Firm—Laubscher & Laubscher

[57] ABSTRACT

A variable ratio parking brake lever mechanism includes a brake lever connected with a support for pivotal movement about a lever pivot axis, a cable track member connected with the support for rotation about a cable track axis spaced from the lever pivot axis, a connecting link connected at one end with the cable track member adjacent the cable track axis, and a slot and pin arrangement connecting the other end of the connecting link with the lever to afford a mechanical advantage such that pivotal movement of lever through a given angle in the brake-applying direction produces a controllably variable rotational angle of displacement of the cable track member in the cable-tensioning direction. The connection between the connecting link and the cable track member is released when the lever is in the brake-released position, whereby the cable track member is free for rotations by a biasing spring to remove slack from the cable.

14 Claims, 4 Drawing Sheets

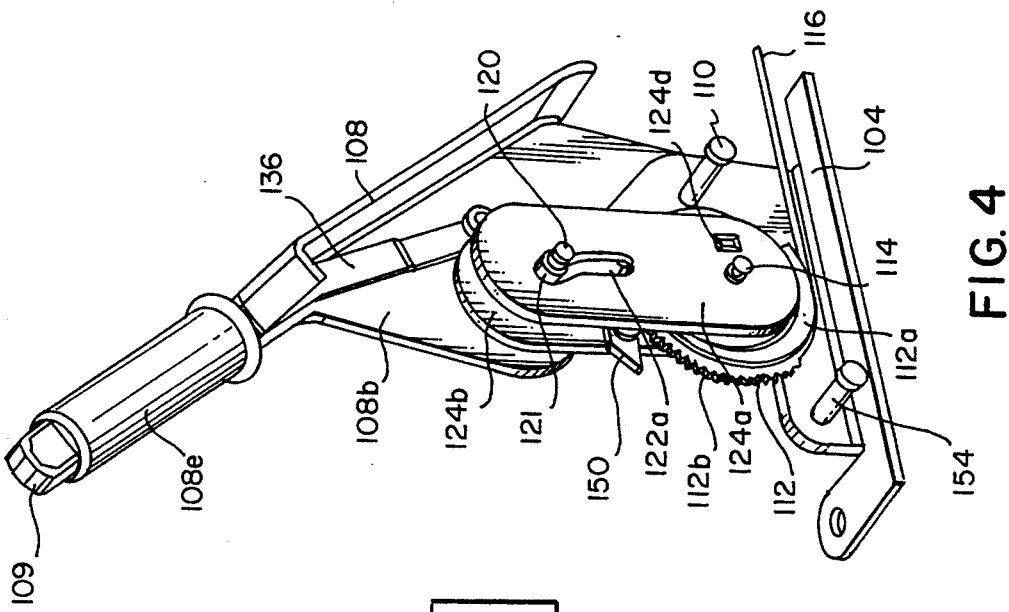
FIG. 4
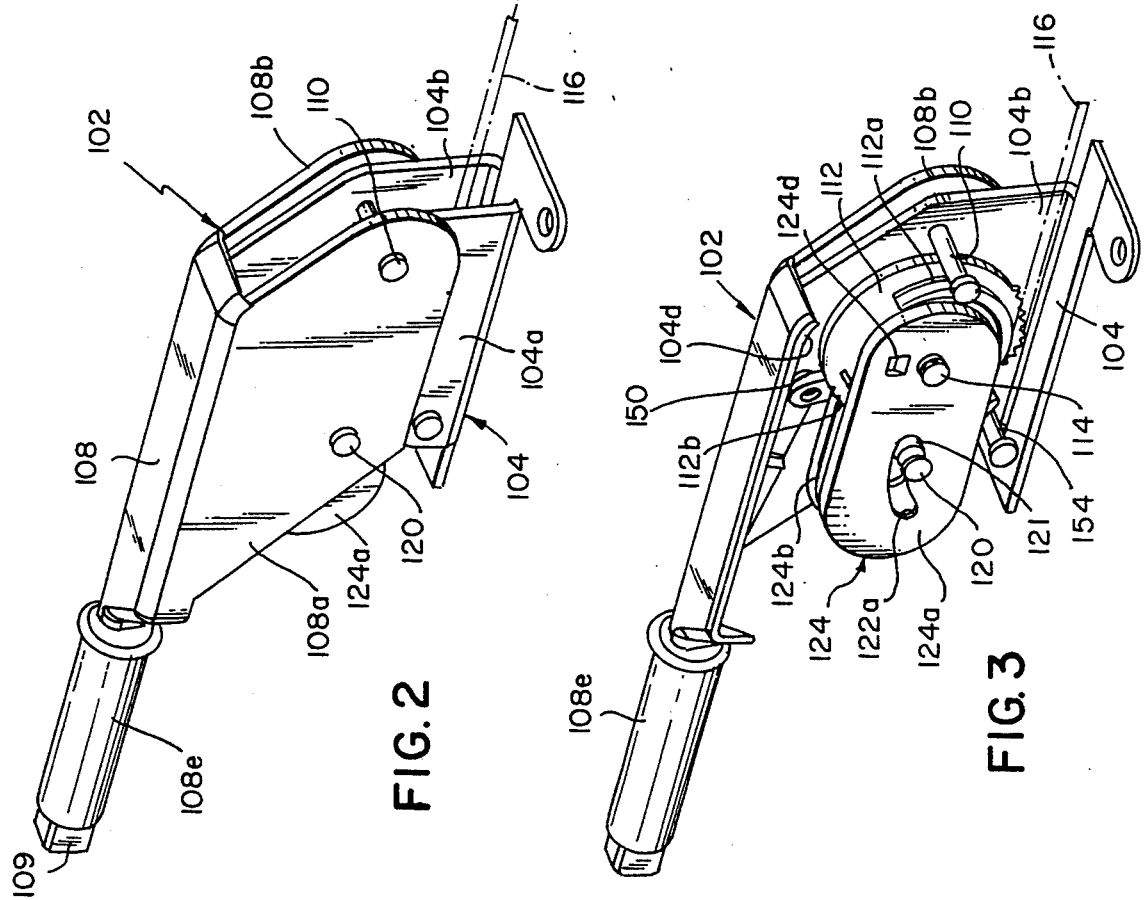
FIG. 2
FIG. 3

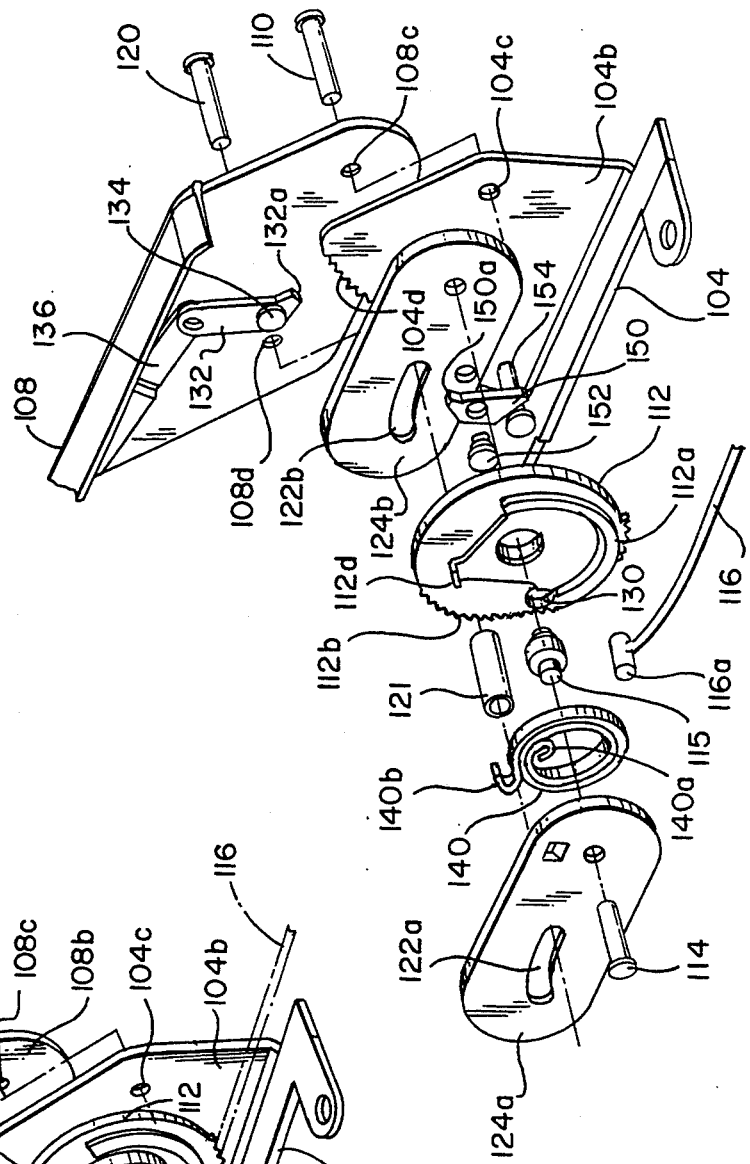
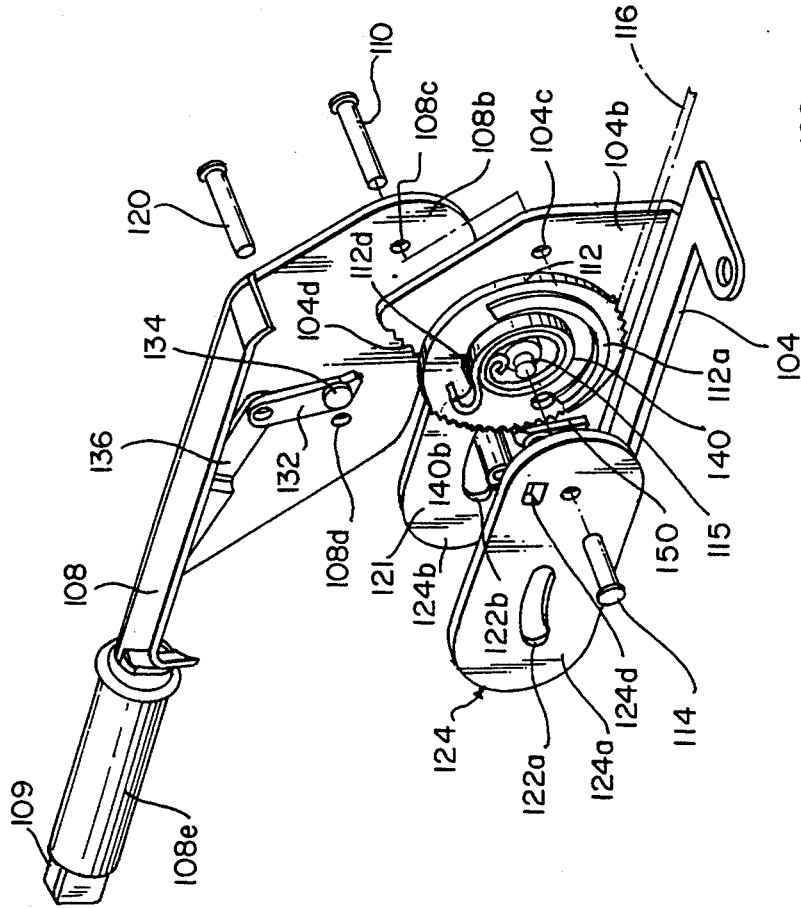
FIG. 6
FIG. 5

VARIABLE RATIO PARKING BRAKE LEVER WITH SELF-ADJUST CABLE TENSIONING MEANS

STATEMENT OF THE INVENTION

A variable ratio parking brake lever mechanism is disclosed which affords a mechanical advantage such that pivotal movement of the parking lever through a given angle of travel in the brake-applying direction produces controllably variable degree of rotational angular displacement of the cable track member in the cable tensioning direction.

BRIEF DESCRIPTION OF THE PRIOR ART

Variable ratio parking brake mechanisms are well known in the patented prior art, as evidenced by the early Hirst U.S. Pat. Nos. 3,487,716 and 3,897,694 (each assigned to the assignee of the present invention), Nagy U.S. Pat. No.3,216,276 and Barlas et al U.S. Pat. No. 5,211,072, among others. In these prior systems, a mechanical advantage is produced for multiplying the force that is applied to the parking brake lever, thereby to achieve a proportional increase in the tensioning of the parking brake cable.

In such auxiliary brake systems, it is desirable to apply sufficient force to the braking system to hold the vehicle on a steep incline while maintaining the input force required by the operator at a reasonable level, thereby necessitating a relative high mechanical advantage ratio. Furthermore, it must generate sufficient linkage motion to allow the system to move from a fully released position to a fully engaged position, all within a limited range of lever motion, thereby requiring a relative low mechanical advantage. Moreover, it is desirable to cause the input effort to increase throughout the lever range of motion in the brake-applying direction, thereby to provide feedback or feel to the operator as to the amount of force that is applied.

Thus, the present invention was developed to provide a parking brake system that will provide low mechanical advantage during initial brake-applying lever motion, a high mechanical advantage at the end of the motion, a steady increase in the braking effort, and sufficient cable motion in a limited range of lever motion. If desired, self-adjust means may be provided for removing cable slack when the lever is in the brake-released position.

SUMMARY OF THE INVENTION

Accordingly, a primary object of the present invention is to provide an improved parking brake lever mechanism in which pivotal movement of the lever in the brake-applying direction produces a controllably variable angular rotational displacement of the cable track member in the cable tensioning direction, use being made of pin and slot connecting means between the lever and the cable track member to produce the desired mechanical advantage at each point of travel of the lever.

According to a more specific object of the invention, the parking brake lever is connected with a support or mounting bracket for pivotal movement about a lever pivot axis, and the cable track member is connected with the support for rotation about a cable track axis displaced from the lever axis, a connecting link being connected at one end with the cable track member, and at the other end, with the lever via slot and pin means that afford the desired mechanical advantage. More particularly, the slot of said connecting means is so arranged and has such a configuration that for a given angle of displacement of the lever in the brake-applying direction, the cable track member is rotated through a corresponding angle controlled by the slot geometry to provide the desired multiplication of force applied to the cable in the cable-tensioning direction.

According to a further object, the connection between the link means and the cable track member may be releasable to permit self adjust removal of slack from the cable when the lever is in the brake-released position. In one embodiment, the releasable connecting means comprise pawl and ratchet means, while in another embodiment, the releasable connecting means comprises a spring clutch.

BRIEF DESCRIPTION OF THE DRAWINGS

Other objects and advantages of the invention will become apparent from a study of the following specification when viewed in the light of the accompanying drawings in which:

FIG. is a diagrammatic representation of an illustrative first hand lever embodiment of the variable ratio parking brake mechanism of the present invention;

FIG. 2 is a perspective view of a second hand lever embodiment of the invention when the operating lever is in the brake-released position, and FIG. 3 is a corresponding view with certain parts removed;

FIG. 4 illustrates the apparatus of FIGS. 1 and 2 when in the brake-engaged condition;

FIGS. 5 and 6 are partially exploded and fully exploded views, respectively, of the apparatus of FIG. 2;

DETAILED DESCRIPTION

Figure 1:
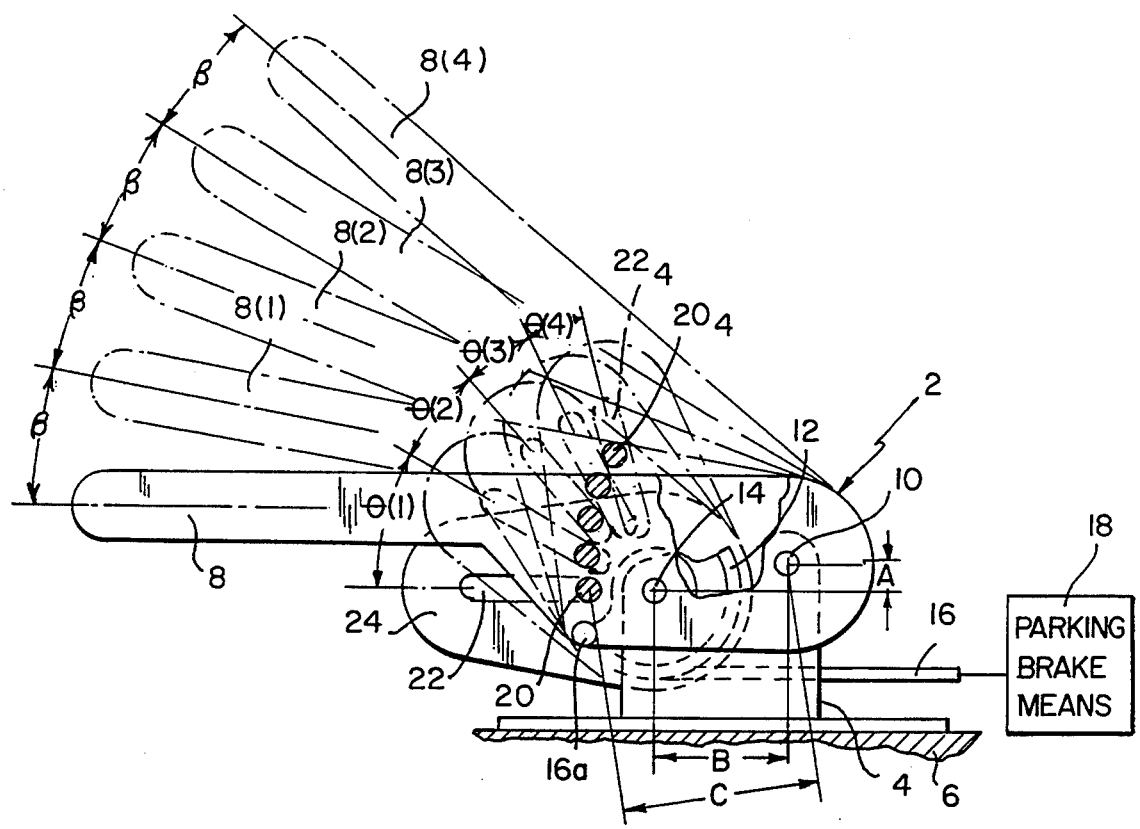

Referring first more particularly to FIG. 1, the parking brake apparatus 2 is of the hand lever type including a mounting bracket 4 connected with a fixed support 6 (such as the fire wall of an automobile). A hand-lever 8 is pivotally connected with the support bracket for movement about lever pivot axis 10, and a cable track member 12 having a generally circular cable track is connected with the support for rotation about cable track axis 14. The parking brake cable 16 has an enlarged first end 16a connected with the circular cable track of member 12, and at the other end the cable is connected with the vehicle parking brake means 18. As will be explained in greater detail below, pin and slot means 20, 22 are provided for affording a mechanical advantage such that for pivot movement of the lever through the angle $\beta$ in the brake-applying direction produces rotational movement of the cable track member 12 in the cable-tensioning direction through a controllably variable angular displacement $\theta_1$, as shown in phantom. The pin 20 is carried by lever 8, and the slot 22 is contained in and extends radially from the axis of rotation 14 of the connecting link means 24 that is mounted for rotation about axis 14. In accordance with the geometry of slot 22, upon further pivotal movement of lever 8 in the brake-applying direction through equal angular increments $\beta$, the cable track member 12 is rotated through different angular increments $\theta_2$, $\theta_3$ and $\theta_4$, respectively.

As shown in FIG. 1, the distance from the pin 20 to the cable pivot axis 14 and the angle between the lever and slot face change throughout the range of motion of the lever, thereby causing the mechanical advantage of the lever to change. By varying the distances A, B, C, the cable track radius, the lever length, and the configuration of the slot, the beginning and end mechanical advantage and the rate of change of mechanical advantage can be tailored to the requirements of the individual system. The lever is held in the applied position by a ratchet and pawl or other locking device, not shown.

Referring now to FIGS. 2-6, the improved parking brake lever mechanism of the instant invention includes a mounting bracket or support 104 having a generally U-shaped cross section defining a pair of parallel upwardly extending spaced walls 104a and 104b. Hand lever 108 having a generally U-shaped cross-sectional configuration includes a pair of downwardly extending outer walls 108a and 108b that straddle the bracket walls 104a and 104b, respectively. The lever 108 is pivotally connected with the mounting bracket 104 by pivot pin 110 that extends through aligned openings contained in the outer lever walls 108a and 108b and the inner bracket walls 104a and 104b. Rotatably supported between the bracket walls 104a and 104b is a cable track member 112 having a generally circular cable track portion 112a that is arranged concentrically about the cable track pin 114 that extends through aligned openings contained within the sidewalls of the mounting bracket 104. As shown in FIG. 6, the cable track member 112 is journalled on bearing sleeve 115 which has a central opening for rotationally receiving the cable track pin 114. Rigidly connected with the ends of the bearing sleeve (by riveting, for example) to define link means 124 are a pair of parallel spaced link members 124a and 124b, respectively. These link members contain slots 122a and 122b that receive the ends of a protective sleeve 121 containing a pin 120 which extends through opposed openings 108d contained in the lever walls. Parking brake cable 116 has an enlarged end portion 116a that is adapted for insertion within a corresponding opening 130 (FIG. 6) contained in the cable track member 112, thereby to fasten the cable to the cable track member.

First pawl and ratchet means are provided for locking the lever 108 relative to mounting bracket 104 as the lever is pivoted from its brake-disengaged position of FIG. 3 toward its brake-engaged position of FIG. 4. More particularly, the mounting bracket wall 104b is provided with integral ratchet teeth 104d that are normally engaged by pawl member 132 that is pivotally supported by the pivot pin 134 on the lever wall 108b. The lever 108 is provided with a release button 109 that is insertable relative to lever handle 108e against the restoring force of a biasing spring (not shown) to pivot pawl 132 by link 136 in a direction to disengage the pawl nose 132a from the ratchet teeth 104d.

According to an important feature of the invention, automatic self-adjust means are provided for removing slack from cable 116 when lever 108 is in the brake disengaged position of FIGS. 2 and 3. More particularly, a spiral spring 140 is mounted concentrically about cable track axis 114 and protective bearing sleeve 115, said spring having bent inner and outer ends 140a and 140b in engagement with corresponding tabs 124d and 112d on the link 124a and on the cable track member 112, respectively. The direction of the spring turns is such as to bias the cable track member 112 in the cable-tensioning direction relative to links 124a and 124b and mounting bracket 104. The cable track member 112 is releasably connected with the connecting link means via second pawl and ratchet means including pawl 150 pivotally mounted on link 124b by pivot pin 152 (FIG. 6), said pawl having a nose portion 150a biased by spring means (not shown) into engagement with ratchet teeth 112b arranged on the outer periphery of cable track member 112. Stop pin 154 extending laterally between mounting bracket walls 104a and 104b serves to disengage pawl 150 from pawl teeth 112b when lever 108 is lowered to the brake disengaged position of FIG. 3.

OPERATION

Assuming that the parking brake lever is initially in the brake-released position of FIGS. 2 and 3, tab 124d on link 124a engages bent inner end 140a of spiral spring 140 to hold spring 140 in a pretensioned state, and, owing to the cooperation between outer spring end 140b and tab 112d, cable track member 112 is rotated in the clockwise direction about cable track pin 114, thereby to apply a pretension force to cable 116. As the lever 108 is manually pivoted upwardly through a given angle in the brake-applying direction, pin 120 in slots 122a and 122b causes the connecting links 124a and 124b of connecting link means 124 to pivot in the clockwise direction about cable track pivot 114. As link means 124 is rotated upwardly in the clockwise direction about pivot pin 114, pawl 150 moves away from stop pin 154, thereby allowing the pawl to rotate into engagement with pawl teeth 112b, whereby cable track member 112 becomes connected with the link means 124. In accordance with a characterizing feature of the invention, owing to the cooperation between pin 120 and slot 122a, a mechanical advantage is produced which causes cable track member 112 to rotate through a controllably variable angle relative to the aforementioned given angle of pivotal displacement of lever 108.

During this upward movement of lever 108 in the brake-applying direction, lever pawl 132 engages ratchet teeth 104d on the mounting bracket wall 104c, thereby to prevent release of the partially-applied brake. Upon further pivotal movement of the lever 108 in the brake-applying direction, the configuration of slots 122a and 122b, in cooperation with other lever geometry controls the "feel" or feedback to the user of the degree of application the parking brake, as well as the degree of mechanical advantage (i.e., such as to produce a high mechanical advantage near the end of the brake-applying motion).

To release the fully-applied parking brakes, button 109 is inserted within handle 108 to release pawl 132 from ratchet teeth 104d, whereupon lever 108 is lowered toward the brake-disengaged position of FIGS. 2 and 3. When pawl 150 engages stop pin 154 (as shown in FIG. 6), pawl 150 is pivoted about pivot pin 152 to disengage pawl nose 150a from ratchet teeth 112b, thereby to release the connection between cable track member 112 and link 124b. Spring 140 is then expanded to rotate cable track member 112 in the cable-tensioning direction (i.e., in the clockwise direction relative to pin 114), thereby to remove slack from the brake system cable, if needed.

Figure 7:
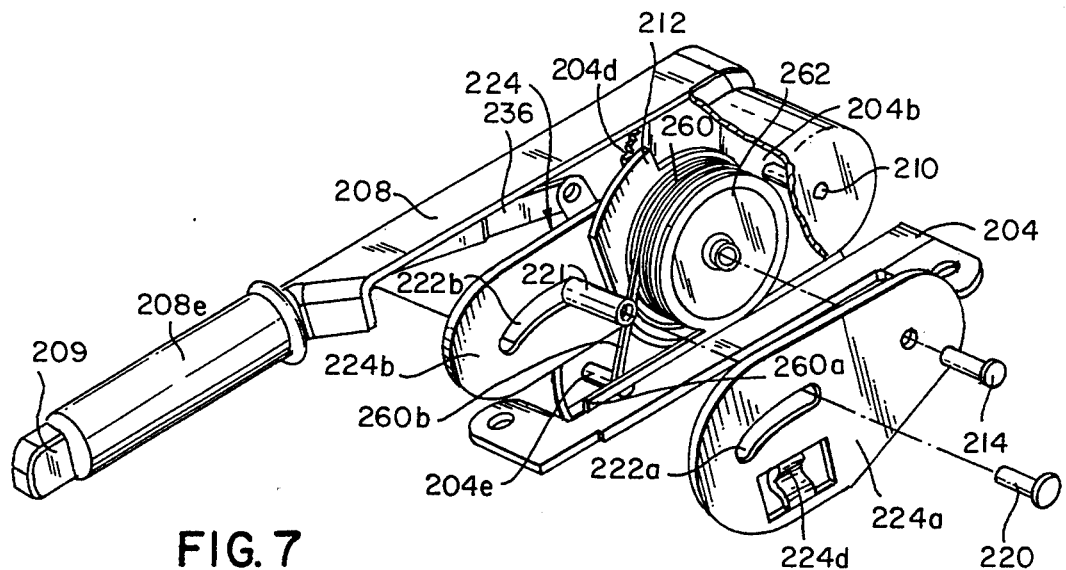
FIG. 7 is a detailed sectional view of a modification of the apparatus of FIGS. 2-6.

According to a modification illustrated in FIG. 7, the connecting link means 224 is releasably connected with the cable track member 212 by conventional clutch spring means including helical clutch spring 260 and clutch drum 262. One end 260a of the clutch spring is rigidly connected by stamped offset 224d with the adjacent wall surface of connecting link 224, and the other end 260b of the clutch spring is arranged to engage a fixed stop 204e on the support bracket 204 when the lever 208 is pivoted downwardly to the brake-disengaged position, thereby expanding the spring turns to disengage the same from the circumferential surface of the drum, as is known in the art. In this embodiment, the mechanical advantage is provided by the cooperation between pin 220 (and protective sleeve 221) and slot 222 contained in the connecting link 224. Drum 262 is biased, as described above, in the cable-tensioning direction by internal spiral tension spring means, not shown.

Figure 8:
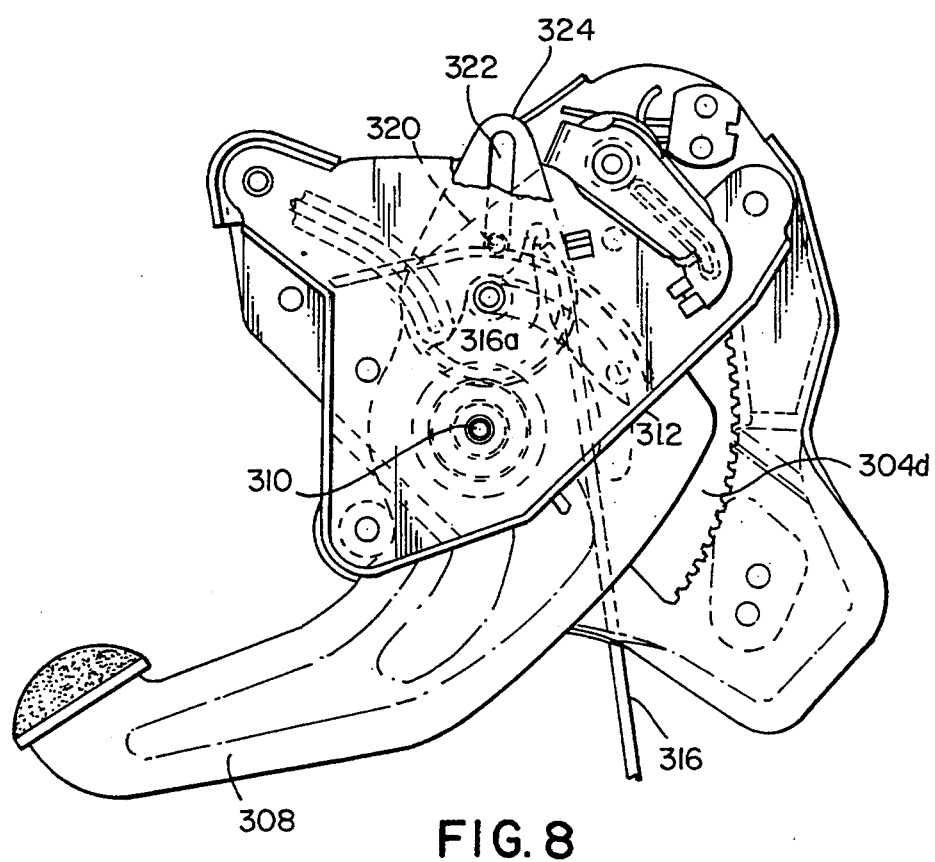
FIG. 8 is an elevational view of a foot-lever embodiment of the invention.

FIG. 8 illustrates a foot-lever embodiment of the invention wherein pin 320 carried by foot lever 308 cooperates with slot 322 contained in connecting link 324 to increase the mechanical advantage and force applied to parking brake cable 316 by the cable track member 312. The operation of this embodiment corresponds with that of the previously disclosed embodiments, and thus will not be repeated.

Figure 9:
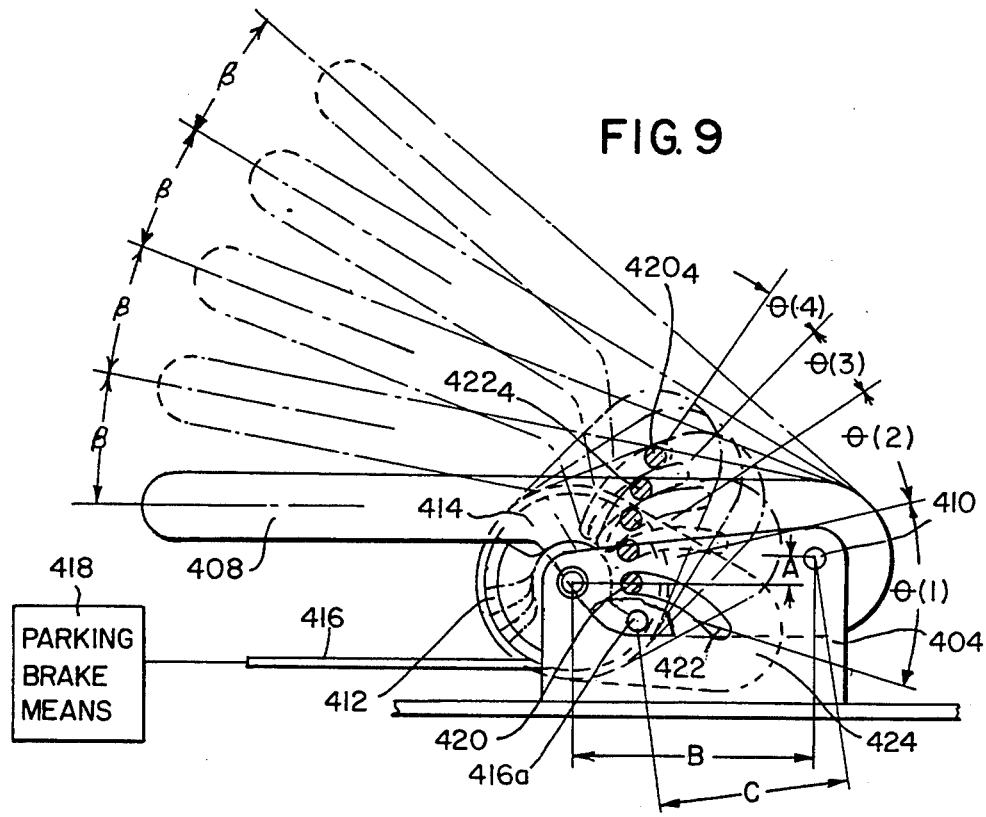
FIG. 9 is a diagrammatic representation of a further embodiment of the invention.

FIG. 9 illustrates a further modification wherein the parking brake cable 416 extends from cable track member 412 in the opposite direction than in the embodiment of FIG. 1. In this embodiment, the pin and slot means 420, 422 are arranged between the lever pivot pin 410 and the cable track axis of rotation 414. Owing to the controllable variable degree of rotation provided by slot geometry, movement of the lever 408 through equal increments $\beta$ produce different angular increments of movement $\theta_1$, $\theta_2$, $\theta_3$ and $\theta_4$ of the cable track member 412.

While the preferred forms and embodiments of the invention have been illustrated and described as required by the Patent Statutes, it will be apparent that other changes and modifications may be made in the apparatus described above.

What is claimed is:

1. Parking brake apparatus for operating a parking brake cable between tensioned brake-applied and nontensioned brake-released conditions, comprising:
   (a) a support member;
   (b) an operating lever having a first end pivotally connected with said support member for pivotal movement about a lever pivot axis in opposite first and second directions toward brake-applied and brake-released end positions, respectively, said operating lever having a second end;
   (c) a cable track member connected with said support member for rotational movement about a cable track axis parallel with and spaced from said lever pivot axis, said cable track member having a generally circular cable track concentrically arranged relative to said cable track axis, said cable track being adapted for connection with one end of the cable;
   (d) mechanical advantage means connecting said cable track member with said operating lever, including:
      (1) link means having a first end connected with said support member for pivotal movement about said cable track axis, said link means having a second end;
      (2) means normally connecting said link means first end with said cable track member; and
      (3) pin and slot means connecting said link means second end for movement relative to said lever, said pin and slot means including a slot having such a configuration that when said lever is pivoted in said first direction through a given angle, said cable track member is rotated through a controllably variable angle in a given cable-tensioning direction to apply tension to the cable; and
   (e) cable-slack-removing means operable when said operating lever member is in said brake-released end position for disconnecting said cable track member from said link means and for rotating said cable track member in said given cable-tensioning direction relative to said link means, thereby to remove slack from the cable.

2. Apparatus as defined in claim 1, and further including retaining means for locking said lever in the brake-applied end position, and release means for releasing said retaining means, thereby to permit return of said lever to the brake-released end position.

3. Apparatus as defined in claim 1, wherein said lever comprises a hand lever.

4. Apparatus as defined in claim 1, wherein said lever comprises a foot lever.

5. Apparatus as defined in claim 1, wherein said pin and slot means has a configuration affording a relatively low mechanical advantage as said lever is initially pivoted from said brake-released end position toward said brake-applied end position, and a relatively high mechanical advantage as said lever approaches the brake-applied end position.

6. Apparatus as defined in claim 1, wherein said pin and slot means includes a pin mounted intermediate the ends of said lever and extending laterally therefrom, said link means containing said slot, said slot receiving said pin.

7. Apparatus as defined in claim 6, wherein the distance between said pin and said lever pivot axis is greater than the distance between said cable track axis and said lever pivot axis.

8. Apparatus as defined in claim 6, wherein the distance between said pin and said lever pivot axis is less than the distance between said cable track axis and said lever pivot axis.

9. Apparatus as defined in claim 1, wherein said cable-slack-removing means includes:
   (1) a spiral spring mounted concentrically about said cable track axis, said spiral spring having inner and outer ends;
   (2) means connecting one of said spiral spring ends with said cable track member and the other spiral spring end with said link means, respectively, said spiral spring having a configuration biasing said cable track member in said first direction relative to said link means; and
   (3) release means for releasing the connection between said cable track member and said link means when said lever is in the brake-released end position.

10. Apparatus as defined in claim 9, wherein said means normally connecting said link means first end with said cable track member includes pawl and ratchet means.

11. Apparatus as defined in claim 10, wherein said pawl and ratchet means comprises a pawl carried by said link means, and ratchet teeth carried by said cable track member for engagement by said pawl; and further wherein said release means includes means for disengaging said pawl from said ratchet teeth when said lever is in the brake-released end position.

12. Apparatus as defined in claim 9, wherein said means normally connecting said link means first end with said cable track member includes helical clutch spring means.

13. Apparatus as defined in claim 12, wherein said helical clutch spring means includes a drum concentrically arranged relative to said cable track axis, said drum being secured at one end to said cable track, and a helical clutch spring mounted concentrically about and in circumferential engagement with said drum, said helical clutch spring having turns and a pair of ends one of which is connected with said link means; and further wherein said release means comprises means cooperating with the other end of said helical clutch spring when said lever is in the brake-released end position to expand the turns of said helical clutch spring relative to said drum, thereby to disconnect said cable track member from said link means.

14. Parking brake apparatus for operating a parking brake cable between tensioned brake-applied and non-tensioned brake-released conditions, comprising:
   (a) support member (204);
   (b) an operating lever (208) having a first end pivotally connected with said support member for pivotal movement about a lever pivot axis (210) in opposite first and second directions toward brake-applied and brake-released end positions, respectively, said operating lever having a second end;
   (c) a cable track member (212) connected with said support member for rotational movement about a cable track axis (214) parallel with and spaced from said lever pivot axis, said cable track member having a generally circular cable track concentrically arranged relative to said cable track axis, said cable track being adapted for connection with one end of the cable;
   (d) mechanical advantage means connecting said cable track member with said operating lever, including:
      (1) link means (224) having a first end connected with said support member for pivotal movement about said cable track axis, said link means having a second end;
      (2) helical clutch spring means normally connecting said link means first end with said cable track member, said helical clutch spring means including:
         (a) a drum (262) concentrically arranged relative to said cable track axis, said drum being secured at one end to said cable track member; and
         (b) a helical clutch spring (260) mounted concentrically about and in circumferential engagement with said drum, said helical clutch spring having a pair of ends one of which is connected with said link means; and
      (3) pin (220) and slot (222) means connecting said link means second end for movement relative to said lever, said pin and slot means including a slot having such a configuration that when said lever is pivoted in said first direction through a given angle, said cable track member is rotated through a controllably variable angle in a given cable-tensioning direction to apply tension to the cable; and
   (e) cable-slack-removing means (204d) operable when said lever member is in said brake-released end position for expanding said helical clutch spring to disconnect said cable track member from said link means and for rotating said cable track member in said given cable-tensioning direction relative to said link means, thereby to remove slack from the cable.

* * * * *